United States Patent [19]

Kikkawa et al.

[11] Patent Number: 4,659,936

[45] Date of Patent: Apr. 21, 1987

[54] LINE WIDTH MEASURING DEVICE AND METHOD

[75] Inventors: Atsushi Kikkawa, Osaka; Noriyuki Kondo; Atsushi Tamada, both of Kyoto, all of Japan

[73] Assignee: Dainippon Screen Mfg. Co., Ltd., Kyoto, Japan

[21] Appl. No.: 810,787

[22] Filed: Nov. 26, 1985

[30] Foreign Application Priority Data

Mar. 22, 1985 [JP] Japan .................................. 60-59161

[51] Int. Cl.$^4$ ........................................... G01N 21/86
[52] U.S. Cl. .................................... 250/560; 356/387
[58] Field of Search ................ 250/560, 578; 356/384, 356/387

[56] References Cited

U.S. PATENT DOCUMENTS 4,385,837  5/1983  Schram .............................. 250/560
4,585,947  4/1986  Liptay-Wagner et al. ......... 250/560

Primary Examiner—Eugene R. LaRoche
Assistant Examiner—David Mis
Attorney, Agent, or Firm—Lowe Price Leblanc Becker & Shur

[57] ABSTRACT

A line width measuring device for measuring the line width in an extremely fine pattern formed on a photomask or wafer employs a photo-electric converter, including a one-dimensional image sensor array, to convert a magnified image of the pattern into serial output signals storable in digitized form. Compensation and averaging of the stored image element information data are performed in known manner and the results are used to detect pattern edges and hence the line width. In one embodiment the one-dimensional image sensor array can be deviated along the array's axis within the inter-element pitch of the array to enhance the precision of line width measurement.

12 Claims, 5 Drawing Figures

LINE WIDTH MEASURING DEVICE AND METHOD

TECHNICAL FIELD

This invention relates to a line width measuring device and a method of using the same, and more particularly, to a device and method for the measurement of an extremely fine pattern formed on a mask or wafer of the kind used in integrated circuits.

BACKGROUND OF THE INVENTION

A fine pattern typically is formed on a generally very thin film on silicon, e.g., a silicon oxide or photo resist film over silicon, and the quality of the integrated circuit (IC, hereinafter) depends on the precision of the pattern's film thickness and the pattern line widths.

Hence for satisfactory production control of ICs a device for line width measurement is required. Currently available devices for this purpose typically utilize a photoelectrically produced photo image of the pattern of interest. The pattern is formed on a thin film, hence for accurate detection of a pattern edge for determining the line width it is necessary to accurately discriminate among minute differences in photo intensity. With such a line width measuring device therefore, its performance is determined by how accurately it is possible to detect a pattern edge from minute photo-intensity differences between photo images obtained from the pattern.

A known line width measuring device of this type uses a photoelectric microscope, as shown in FIG. 1, wherein 1 designates a microscope, 2 a specimen of the mask or wafer set on the microscope, 3 a photo-electric conversion element and 4 a slit which is driven synchronously with the photo-electric conversion element 3. Element 6 is a current-voltage converter comprising an amplifier, and 7 is digital counter. Signal processing means 8, e.g., a microcomputer which also controls a stepping motor 5, computes a photo-intensity signal received from the current-voltage converter 6, computes the line width, and outputs the result either to a display 9a or to a printer 9b. 8a is a keyboard to control the various operations.

A line width measuring device so using a photo-electric microscope measures the pattern's line width as follows:

The specimen 2 that is to be measured is first put on the specimen mount of the microscope 1. Watching through the binocular eyepiece 10, the user then moves pattern 12 in the direction indicated by the arrow to a position, for example, on the righthand side of the vertical line of the microscope's cross-hairs 11. See FIG. 2. Signal processing means 8 is then started. Slit 4 and photo-electric conversion element 3 are driven intermittently in one direction by stepping motor 5 controlled by the signal processing means 8, the image signal I of the pattern 12 is outputted stepwise, and the photo-intensity signal K so obtained is amplified by current-voltage converter 6. The photo-intensity signal, K, is compared with a predetermined reference level signal in the signal processing means 8 for the line width of the pattern 12 to be computed thereby, and the result is displayed or printed in units of 0.05 μm.

It is also possible to use an image pickup tube instead of the combination of the slit and the photo-electric conversion element. In this case, however, the distortion of the image displayed on the tube must be less than 0.2%, hence compensation of the distortion, improvement of stability, etc., will be necessary in practical use. In yet another known method the scanning of the specimen's surface is done with a fine laser beam for detecting the scattering of rays due to pattern edges to thereby measure the line width.

In the above-mentioned prior art, involving scanning of the specimen's surface by a combination of a slit and a photo-electric conversion element, the image signal is outputted stepwise during scanning. Hence shortening of the measuring time is not feasible, particularly when a plurality of scans must be made for improved precision. As to the prior art in which the specimen's surface is scanned by the laser beam, the laser beam scanning optical system becomes complicated and limits the productivity of such device while resulting in increased production costs.

A need, therefore, exists for a simple, inexpensive and precise apparatus and method for measuring line width in very fine patterns.

DISCLOSURE OF THE INVENTION

It is an object of the present invention to provide a line width measuring device that is accurate, simple, and inexpensive in production. In order to accomplish this objective the apparatus of the present invention provides a line width measuring device in which the actual pattern serves as the object for a magnifying optical system which projects it onto a photo-electric conversion means for photo-electric conversion, and the line width is then measured by signal processing means such as a computer through computation of an analog-digital converted signal. The present invention is characterized in that the photo-electric conversion means is composed of a one dimensional image sensor array, the output signal from which is amplified and outputted serially. It is also possible to perform the conversion by an A/D converter having a resolution of more than $2^{10}$, prestore the variation of sensitivity among the elements constituting the one dimensional image sensor array and compensate the aforesaid digital signal for such a variation on the basis of the stored data. It is also possible to connect the one dimensional image sensor array with a deviation means such as an piezo-electric element so as to allow deviation of the constituent elements in the direction of the aforesaid one dimensional array within the array's inter-element pitch.

The output signal from the one dimensional image sensor array is taken out serially through a means for converting its output into serial signals and then reconverted by a A/D converter into a digital signal to be processed for statistical computation, hence the image signal corresponding to the required width on the specimen can be obtained quickly. Particularly when conversion of the sensor array's output into a digital signal is done by the use of an A/D conversion means having a resolution of more than $2^{10}$, it is possible to discriminate the image signal levels of up to approximately 1,000 graduations. Moreover, when it is so arranged that the variation among the constituent elements of the one dimensional image sensor array is compensated for by the signal processing means, e.g., a computer, before statistical computation is made thereof, it is possible to secure a broad dynamic range by the use of the one dimensional image sensor array. When it is so arranged that the one dimensional image sensor array is minutely deviated by the use of a deviation means as previously mentioned, image information may be obtained at subdivided positions of the inter-element pitch of the array, hence the amount of pattern edge information becomes ample and allows a still more accurate detection of the pattern edges. The present invention is based on the recognition that by compensating the original signal by the use of a one dimensional image sensor array instead of a photo-electric multiplier tube, an ample dynamic range and ample S/N ratio can be obtained, and this benefit is applied to a line width measuring device. A preferred embodiment of the present invention is described below with reference to the appended drawings.

It is another object to provide methods of making very precise measurements of line width by means of a one dimensional image sensor array.

BEST MODE FOR PRACTICING THE INVENTION

Figure 1:
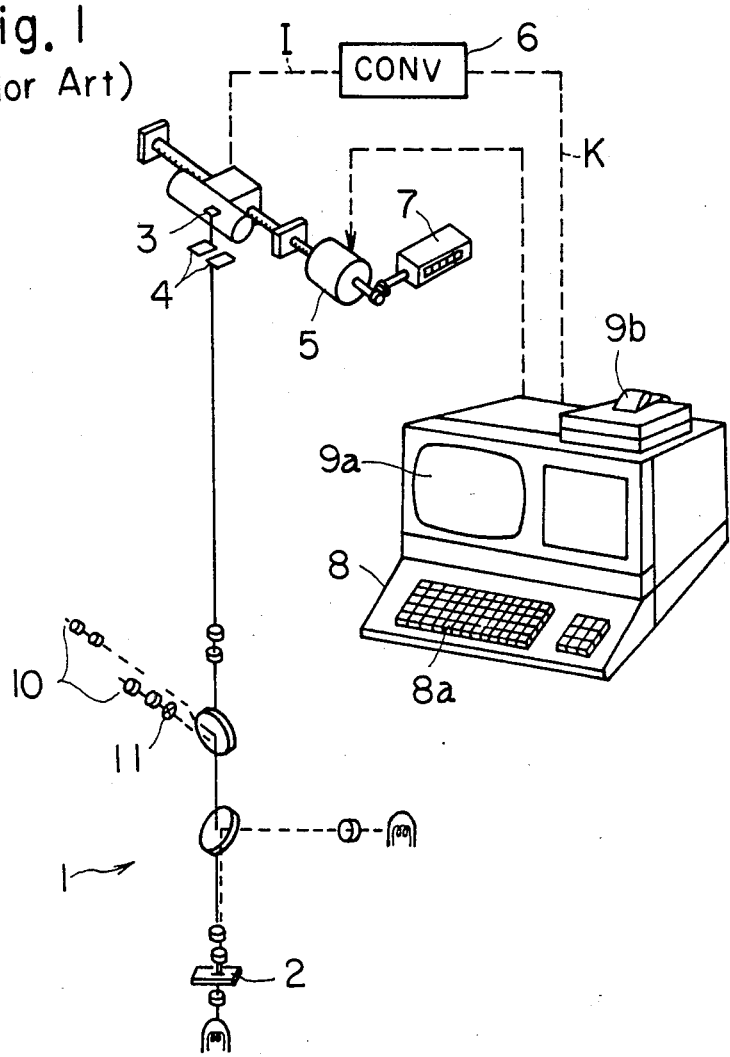
FIG. 1 is a partially exploded schematic representation of apparatus known in the prior art.
Figure 2:
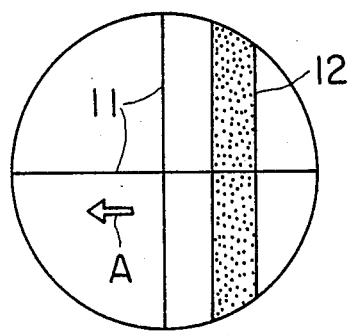
FIG. 2 is an enlarged view of a portion of the apparatus of FIG. 1.
Figure 3:
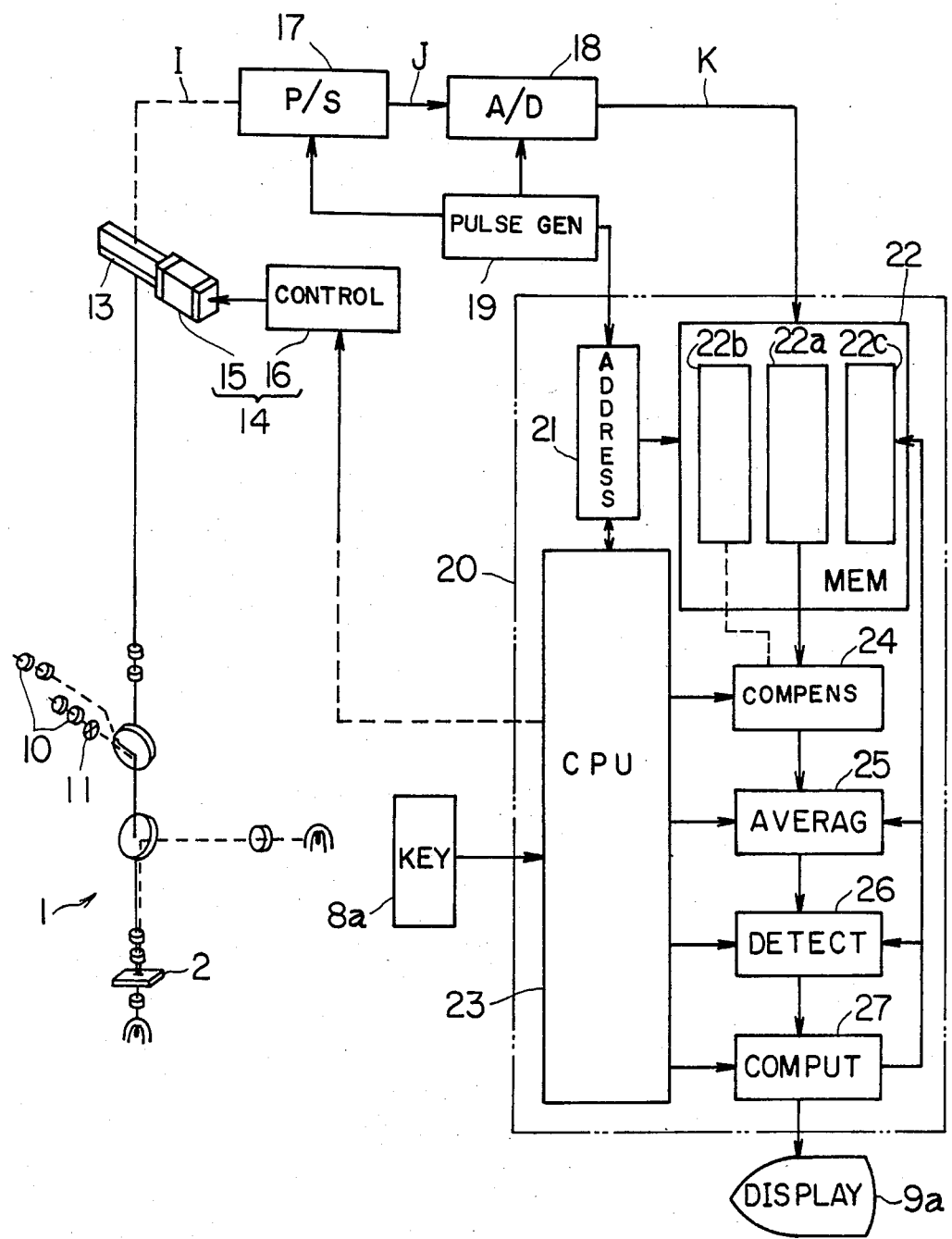
FIG. 3 is a block diagram of the apparatus of the preferred embodiment of this invention.

Referring to FIG. 3, 13 is a one dimensional image sensor array composed of Charge Coupled Devices (CCD) arranged in the focal plane of a microscope 1. A deviating means 14, composed of a piezoelectric element 15 and its control circuit 16, is provided for deviating the one dimensional image sensor array along its axis. A parallel-series conversion circuit 17 (hereinafter called "P/S conversion circuit") is provided for outputting serially the signal I photo-electrically converted by one-dimensional image sensor array 13 and inputted in parallel after amplification. A/D converter 18 preferably has a resolution of, for example, 10 bits, and a timing pulse generator circuit 19 is provided for outputting a timing signal to the P/S conversion circuit 17, A/D converter 18 and an address designating means 21 of a signal processing means 20 (to be further described later), respectively. The aforesaid one dimensional image sensor array 13 is composed, for example, of 2,048 elements each in a size of 15 $\mu$m $\times$ 15 $\mu$m, and in this case it is possible to output photo-electric converted signals for an approximately 3 cm long projected image at once.

Incidentally, if the magnification factor is 100, the length of the specimen 2 is approximately 0.3 mm, hence an image element as small as 0.15 $\mu$m $\times$ 0.15 $\mu$m in size is recognizable.

A one-dimensioal image sensor array Photo Diode Array (PDA, hereinafter) can be used instead of the CCD array.

When A/D converter 18 is a 10-bit one, the image signal J amplified by this P/S conversion circuit 17 and outputted serially is converted into digital signals K at 1,024, graduation signal levels. Experimental data show that a good reproducibility is ensured when a 12-bit A/D converter is used even when the signal level is subdivided into 4,096 graduations. Such digital signal K are written into 2,043 different addresss in the image information memory sector of the internal memory 22 by the aid of an address designating means 21.

Figure 4:
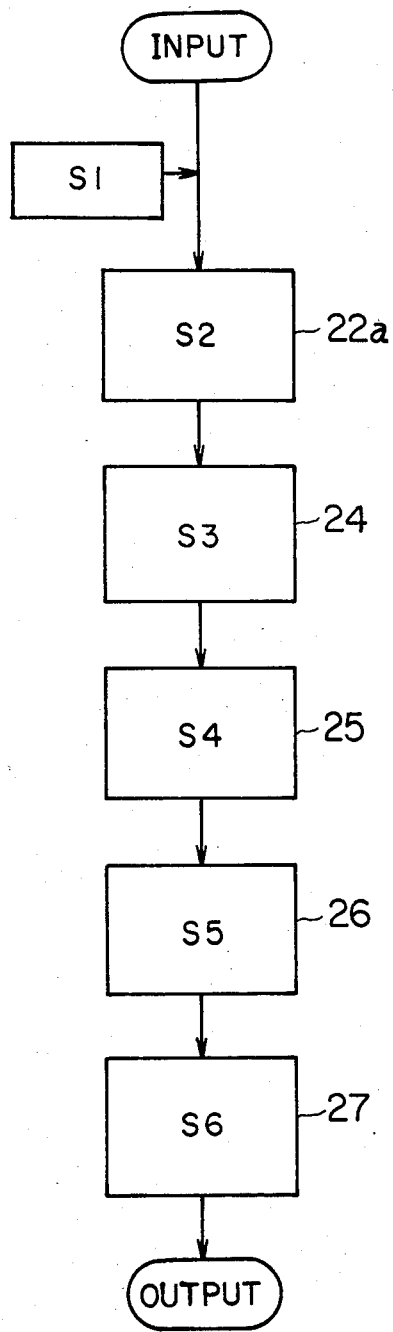
FIG. 4 is a flow chart of the signal-processing scheme.

The signal processing means 20 is composed of a central processing unit (hereinafter called "CPU") 23, pattern edge detection means 26 and line width computing means 27, and these are so arranged that the line width of the pattern 12 is outputted to the outputting device 9a according to the flow chart of FIG. 4.

In operation, it is necessary to compensate the 2,048 pieces of image information stored in the image information memory sector 22a, for the photo-electrically converted output from the one dimensional image sensor array 13 is expected to have a variation with regard to element's sensitivity up to +/−10% and furthermore a slight dark current is caused even when each element does not receive light. In the line width measuring device of the present invention, it is so arranged that the intensity of dark current Di (i=1–2,024) and the sensitivity Si (i=1–2,024) are prestored as sensitivity information in the sensitivity information memory sector 22b. Sensitivity information Di and Si are read out corresponding to each image information Xi (i=1–2,024), for compensation to be made by an image information compensating means 24 according to, for example (Xi−Di)/(Si−Di) to thereby approximate the signal level of the digital image signal K as image information.

The compensated image information is statistically treated, e.g. by averaging or edge detection, for the line width to be computed thereafter. Such averaging or edge detection is well known to those skilled in the art. Here, with a given element as the center one, two adjacent elements are taken from both sides thereof and averaging is made of these five elements. The average value thus obtained to be taken as the output value for the particular element, and this averaging is preferably repeated, e.g. three times, for improved precision. Edge detection provides that with the interim information data averaged (100% as maximum and 0% as minimum), and data at a predetermined level detected, e.g. at 35% pattern edge detection is read out from a corresponding address.

A second feature of the line width measuring device of the present invention is that it is so arranged that the one dimensional image sensor array 13 can be deviated within the inter-element pitch of the array by the aid of deviating means 14. The deviating means 14 comprises, for instance, a piezoelectric element 15 connected to one end of the one dimensional image sensor array 13. This piezoelectric element 15 is controlled by the piezoelectric element control circuit 16 according to instructions from the signal processing means 20.

In the preferred embodiment, the voltage applied to the piezoelectric element 15 is in five alternative steps for the length of the piezoelectric element 15 to be varied in units of 3 $\mu$m, so that the one dimensional image sensor array connected to one end of the piezoelectric element 15 is deviated in units of 3 $\mu$m for the photo-electric signal I to be taken out at each deviated position. In this embodiment it is possible, for instance, to obtain image information at interevals of 3 $\mu$m when the inter-element pitch of the array is 15 $\mu$m, hence the resolution is five times higher than when the one dimensional image sensor array 13 is not deviated. Thus, as mentioned above, even if the detectable size is 0.15 $\mu$m per element, it is possible to detect image elements as small as 0.03 $\mu$m.

Figure 5:
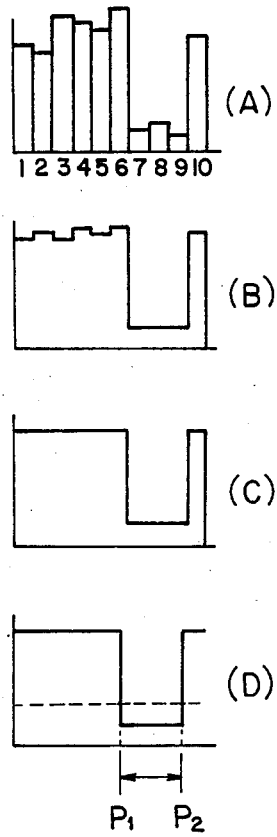
FIG. 5 is a diagrammatic graph showing how signal processing is carried out accordingly to the flow chart of FIG. 4.

The present invention is not limited to the abovementioned embodiment, and it is possible to increase the magnification factor of the microscope or to decrease the extent of deviation for making the detectable image element still smaller. On the abscissa of FIG. 5 are plotted the values of output signals from the one dimensional image sensor array 13 and on the ordinate are plotted the digital signals' output levels from the A/D converter 18.

Described below is the function of the line width measuring device of this embodiment, with reference to FIGS. 3, 4 and 5.

In the first step, $S_1$, the integrating time t for the one dimensional image sensor array 13 is preset. When the signal processing means 20 has been started by pushing a key 8a, the elements of one dimensional image sensor array 13 accumulate simultaneously the quantities of light of the projected image for the integrating time 7. Then in the second step, $S_2$, the image information K of the signal level as shown in FIG. 5A is stored in the image information memory sector 22a through the P/S conversion circuit 17 and the A/D converter 18. This image information K is approximated to the real value in the third step, $S_3$, by means of the image element information compensation means 24, and is compensated to a signal level as shown in FIG. 5B. In the fourth step, $S_4$, the signal is smoothened as shown in FIG. 5C by means of an averaging means 25, and in the fifth step, $S_5$, the edge points $P_1$ and $P_2$ are detected.

Although the edge points $P_1$ and $P_2$ are determined by detecting the signal at the given signal level, shown in FIG. 5D as a dashed line, it is also possible to determine them by obtaining the maximum difference in output signal level between the adjacent image elements. In the sixth step, $S_6$, the line width is computed by a line width computing means 27 on the basis of the edge points $P_1$ and $P_2$ and its result is displayed on the outputting device 9a. The image information K read out by deviating the one-dimensional image sensor array 13 several times (for instance a pitch of 15 μm divided into five units of 3 μm each) is stored by the aid of the address designating means 21 at the predetermined address in the image information memory sector 22a, and further edge points are detected in a like manner.

Although in this embodiment the deviating means 14 is described as comprising a piezoelectric element 15 and its control circuit 16, the present invention is not so limited and it is also possible in one alternative to deviate the one dimensional image sensor array by the use of a mechanical means such as a wedge.

In the preferred embodiment, an A/D converter having a resolution of, for example $2^{10}$, was used in order to obtain a digital signal of a resolution of more than $2^{10}$, but the present invention is not limited thereby and it is also possible to use as A/D converter having an ordinary resolution of $2^8$ and to obtain a digital signal of a resolution of more than $2^{10}$ by one of the known data processing methods.

The present invention, as described above, provides numerous advantages over the prior art, as follows:

a. Since a one-dimensional image sensor array is used as a photoelectric conversion means and the image information for a given width on the specimen therefore is easily accessible, it is possible to significantly shorten the time required for measuring.

b. Unlike the prior art counterpart, the device of the present invention does not need a photoelectric means and slit-driving means, or a scanning optical system for scanning with a laser beam, hence it is simpler in construction, has higher productivity, and is much less expensive.

c. Again, unlike the prior art counterpart, it is not necessary to adjust the slit width. Hence scattering of the measuring precision can be precluded, when arrangement is made for approximating the image signal level to the true value through compensation for elimination of scattering with regard to interelement sensitivity, scattering caused by dark current and also scattering with regard to photo-intensity distribution.

d. Especially when a deviating means is provided for minutely deviating the one dimensional image sensor array within the inter-element pitch of the array, the resolution of the device can be made correspondingly higher, hence the line width of a given pattern can be measured with an improved precision.

It should be apparent from the preceding that the invention may be practices otherwise than as specifically described and disclosed herein. Modifications may therefore be made to the specific embodiments disclosed here without departing from the scope of this invention, and are intended to be included within the claims appended below.

What is claimed is;

1. A line width measuring device, for measuring the line width of a line in a pattern on a specimen, comprising:

a magnifying optical system through which said line pattern of the specimen to be examined is projected under predetermined magnification;

a photo-electric conversion means for converting the image of said pattern projected under magnification, said photo-electric conversion means comprising a one dimensional image sensor array and a P/S conversion circuit for outputting serial output signals;

an A/D converter for A/D converting of the signals outputted by said photo-electric conversion means;

a signal processing means for computing the line width of line pattern according to the output signal from said A/D converter; and means for outputting the computed result.

2. A line width measuring device as recited in claim 1, wherein: said A/D converter has a resolution of more than $2^8$.

3. A line width measuring device as recited in claim 1, wherein;

said signal processing means comprises a central processing unit (CPU);

address designating means for designating addresses for data;

memory means in which sensitivity information, image information and interim information are stored in addresses corresponding to individual elements of the one dimensional image sensor array;

image element information compensation means for compensating the image element information according to the sensitivity information of each of said elements;

averaging means for averaging of said compensated image element information data;

edge detecting means for cutting said averaged compensated data at a predetermined level for thereby detecting the pattern edge from the corresponding address numbers; and line width computing means for computing the line width from the pattern edges.

4. A line width measuring device as recited in claim 1 wherein:

said one dimensional image sensor array is provided with a deviating means for minutely moving said sensor array in the direction of the array's axis.

5. A line width measuring device as recited in claim 4 wherein said deviating means comprises a piezoelectric element and a piezoelectric element control circuit and is arranged so that said one dimensional image sensor array can be minutely deviated within the inter-element pitch of said array.

6. A method for measuring individual line widths of lines forming a fine pattern, comprising the steps of:

optically magnifying an image of the pattern to a predetermined magnification;

impinging said magnified image onto a one dimensional image sensor array and developing therefrom serial output signals;

converting said output signals into corresponding digitized signals; and computing the line width by processsing said digitized signals.

7. A method for measuring individual line widths according to claim 6, comprising the further step of: compensating for variations among the individual elements of said one dimensional image secmsor array.

8. A method for measuring individual line widths according to claim 7, comprising the further step of:

averaging a predetermined number of outputs from a predetermined number of individual adjacent elements of said one dimensional image sensor array to produce an averaged value for a particular one of said individual adjacent elements.

9. A method for measuring individual line widths according to claim 8, comprising the further step of:

detecting an edge of a line by comparing said averaged values to determine a predetermined level of difference between values corresponding to adjacent elements in said one dimensional image sensor array.

10. A method for measuring individual line widths according to claim 6, comprising the further step of:

moving said one dimensional image sensor array by a small predetermined amount.

11. A method for measuring individual line widths according to claim 7, wherein:

said movement is obtained by application of a piezoelectric force.

12. A method for measuring individual line widths according to claim 7, wherein:

said movement is obtained by application of a force exerted by a wedge.

* * * * *